(12) United States Patent
Nakatsu

(10) Patent No.: US 6,827,920 B2
(45) Date of Patent: Dec. 7, 2004

(54) METHOD FOR PREPARING BARIUM FLUOROHALIDE-BASED CRYSTAL

(75) Inventor: Masaharu Nakatsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 420 days.

(21) Appl. No.: 10/071,201

(22) Filed: Feb. 11, 2002

(65) Prior Publication Data

US 2002/0155056 A1 Oct. 24, 2002

(30) Foreign Application Priority Data

Feb. 16, 2001 (JP) ........................................ 2001-039695

(51) Int. Cl.$^7$ ............................ C01F 11/22; C01F 11/24
(52) U.S. Cl. .................... 423/466; 423/497; 250/484.4; 252/301.4 H
(58) Field of Search ................................ 423/466, 497; 250/484.4; 252/301.4 H, 301.4 R

(56) References Cited

U.S. PATENT DOCUMENTS

| | | | | |
|---|---|---|---|---|
| 3,668,143 A | * | 6/1972 | Luckey | ........................ 423/466 |
| 5,534,191 A | * | 7/1996 | Hasegawa et al. | ... 252/301.4 H |
| 5,904,995 A | * | 5/1999 | Maezawa et al. | ........... 428/690 |
| 5,952,666 A | * | 9/1999 | Nakano et al. | .......... 250/484.4 |
| 6,444,142 B1 | * | 9/2002 | Matsumoto et al. | . 252/301.4 H |

FOREIGN PATENT DOCUMENTS

| | | |
|---|---|---|
| JP | 7-233369 | 9/1995 |
| JP | 10-195431 | 7/1998 |

* cited by examiner

*Primary Examiner*—Ngoc-Yen Nguyen
(74) *Attorney, Agent, or Firm*—Sughrue, Mion, PLLC

(57) ABSTRACT

A method for preparing barium fluorohalide-based crystal, which includes at least a step in which a halide aqueous solution (B) and aqueous solutions of a fluoride and a barium salt are mixed into a halide aqueous solution (A). The halide aqueous solution (B) contains the same halogen as that contained in the halide aqueous solution (A). In this method, halide ions are used efficiently rather than remaining to form a waste residue.

20 Claims, No Drawings

METHOD FOR PREPARING BARIUM FLUOROHALIDE-BASED CRYSTAL

BACKGROUND OF THE INVENTION

1. Field of the Invention

The present invention relates to a method for preparing barium fluorohalide-based crystal, and particularly to a method for preparing a barium fluorohalide-based crystal useful as a phosphor material.

2. Description of the Related Art

It is desired that a crystal for use in oscillation of a laser or the like should have lattice defects reduced as much as possible. However, there are cases in which it is important to positively introduce a lattice defect into a crystal or glass and also to control the defect for the purpose of expressing a new optical functionality. A phenomenon of stimulated emission which has been remarked on in recent years is exhibited, principally by a combination of a crystal and a glass each having a large number of defects. Conventionally, there has been known a crystal represented by BaFX:Eu$^{2+}$ (wherein X=Br or I) having a defect such as a color center which emits light (instantaneous emission of light) in ranges from a near-ultraviolet region to a blue beam region by excitation thereof with radiation such as an X-ray, electron beam or ultraviolet ray. The crystal is used as a phosphor for a radiosensitive screen employed in radiography or the like.

Further, it has recently been found that, when the phosphor is irradiated with radiation such as an X-ray, electron beam or ultraviolet ray, and thereafter excited with an electromagnetic wave (excitation light) in ranges from a visible region to an infrared region, the phosphor emits light (stimulated emission) in ranges from a near-ultraviolet region to a blue beam region (hereinafter referred to as "stimulable characteristics"). Thus, the above-described phosphor has been noted especially useful as a phosphor for radiation image conversion panels which are used by radiation image recording and reproducing methods.

The above-described radiation image recording and reproducing method is organized in such a manner that radiation energy transmitted through a subject or emitted from an object to be examined is absorbed into a stimulable phosphor of a radiation image conversion panel. Thereafter, the stimulable phosphor is excited by an electromagnetic wave in a time sequential manner to thereby allow the radiation energy accumulated in the stimulable phosphor to emit as fluorescence. An electric signal is obtained by photoelectrically reading the fluorescence, and thereafter, based on the obtained electric signal, a visual image is produced on a recording material such as a photosensitive film, or on a display device such as a CRT.

The above-described phosphor is generally prepared by the following method. First, a mixture of phosphor raw materials is prepared by homogeneously mixing the phosphor raw materials in a dried state (a dry process) or by homogeneously mixing the phosphor raw materials in a slurry state and then drying (a wet process). Subsequently, the mixture of the phosphor raw materials is calcined, ordinarily at a temperature near a melting point of a host crystal (Ba, FX or the like) in a reducing atmosphere or the like substantially close to atmospheric pressure for several hours. Due to the calcining, the host crystal of the phosphor grows and, at the same time, activator elements are diffused in the host crystal. As a result, a color center which serves as a central source of stimulable emission is also generated.

A method for preparing barium fluorohalide-based crystal (hereinafter referred to as "BaFX-based crystal") which serves as the host crystal in a phosphor material is disclosed in, for example, Japanese Patent Application Laid-Open (JP-A) Nos. 7-233369 and 10-195431. However, in these conventional preparing methods, the BaFX-based crystal is obtained based on the following reaction formula (1). In this case, excessive halide ions (principally bromide ions) remain as a residue. As a result, there is a problem that raw materials may be substantially consumed wastefully or liquid stability may deteriorate.

$$NH_4X+BaX_2+AF \rightarrow BaFX+NH_4^{+}+A^{+}+2X \qquad (1)$$

(in the above reaction formula (1), X represents a halogen atom and A$^+$ represents a positive ion such as NH$_4^+$.

SUMMARY OF THE INVENTION

An object of the present invention is to provide a method for preparing barium fluorohalide-based crystal under conditions in which various raw materials such as halide ions in a preparing process are efficiently used, a residual portion of the raw materials is suppressed, and there is little variation in the amount of halide ions existing in a reactant mother liquor during preparation.

The above-described object can be achieved by the method for preparing barium fluorohalide-based crystal according to the present invention, which is described below. That is, the first aspect of the present invention is a method for preparing barium fluorohalide-based crystal, the method comprising the steps of: preparing a halide aqueous solution (A); preparing a halide aqueous solution (B) which includes a halogen the same as a halogen included in the halide aqueous solution (A); preparing a fluoride aqueous solution; preparing a barium salt aqueous solution; and thereafter mixing the halide aqueous solution (B), the fluoride aqueous solution and the barium salt aqueous solution into the halide aqueous solution (A) for generating a precipitate of BaFX-based crystals, in which X represents any of Br, Cl and I.

In accordance with a second aspect of the present invention, there is provided a method for preparing barium fluorohalide-based crystal, the method comprising steps of: providing a halide aqueous solution (A); providing a halide aqueous solution (B) which includes a halogen the same as a halogen included in the halide aqueous solution (A); and substantially simultaneously mixing each of at least the halide aqueous solution (B), a fluoride aqueous solution and a barium salt aqueous solution into the halide aqueous solution (A).

In accordance with a third aspect of the present invention, there is provided a method for preparing barium fluorohalide-based crystal, the method comprising the steps of: providing a halide aqueous solution (A); preparing a mixed solution of a fluoride aqueous solution and a halide aqueous solution (B) which includes a halogen the same as a halogen included in the halide aqueous solution (A); and substantially simultaneously mixing each of the mixed solution and a barium salt aqueous solution into the halide aqueous solution (A).

DESCRIPTION OF THE PREFERRED EMBODIMENTS

A barium fluorohalide-based crystal obtained by a method for preparing a barium fluorohalide-based crystal according to the present invention can be used not only for a phosphor material, but also in any field in which barium fluorohalide-based crystals are employed.

The method for preparing barium fluorohalide-based crystal according to the present invention includes at least a precipitate generating process in which a halide aqueous solution (B), a fluoride aqueous solution and a barium salt aqueous solution are mixed with a halide aqueous solution (A). The halide aqueous solution (B) contains the same halogen as that contained in the halide aqueous solution (A). A precipitate of BaFX-based crystal (X represents any of Br, Cl and I) is generated in a reactant mother liquor.

Further, as a process subsequent to the precipitate generating process, preferably, at least a separating process for separating the precipitate from the reactant mother liquor is provided. Moreover, as a process subsequent to the separating process, preferably, at least a calcination process for calcining the separated precipitate is provided. These processes will be described hereinafter.

[Precipitate Generating Process]

The precipitate generating process is a process in which the fluoride aqueous solution, the halide aqueous solution (B) and the barium salt aqueous solution are mixed into the halide aqueous solution (A), and a precipitate of BaFX-based crystal is generated.

Examples of the halogen contained in the halide aqueous solution (A) include Br, Cl and I. When the prepared BaFX-based crystal is to be used as a phosphor material, Br and I are preferable. Particularly, Br is preferably used from the standpoint of productivity.

Examples of the halide aqueous solution (A) which can be used include aqueous solutions of ammonium bromide, hydrogen bromide, lithium bromide, potassium bromide, hydrogen iodide, ammonium iodide, lithium iodide, sodium iodide, potassium iodide, hydrogen chloride, ammonium chloride, lithium chloride, sodium chloride and potassium chloride. Among these, an aqueous solution of ammonium bromide is particularly preferable.

The concentration of the halide aqueous solution (A) is preferably in a range from 4.2 mol/L to a saturation concentration, more preferably in a range from 4.6 mol/L to the saturation concentration, and further preferably in a range from 5.0 mol/L to the saturation concentration.

If the concentration is less than 4.2 mol/L, efficiency of precipitation may be deteriorated. Further, if the concentration exceeds the saturation concentration, halide may be mixed in the precipitate and wasteful consumption of raw materials may occur.

Examples of the fluoride aqueous solution which can be used include aqueous solutions of ammonium fluoride, hydrogen fluoride, sodium fluoride and potassium fluoride. Particularly, an aqueous solution of ammonium fluoride is preferably used.

The concentration of the fluoride aqueous solution is preferably 0.5 mol/L or more. If the concentration is less than 0.5 mol/L, yield may be lowered, which is not preferable in terms of productivity.

Examples of the halide aqueous solution (B) which can be used include aqueous solutions of ammonium bromide, hydrogen bromide, lithium bromide, potassium bromide, hydrogen iodide, ammonium iodide, lithium iodide, sodium iodide, potassium iodide, hydrogen chloride, ammonium chloride, lithium chloride, sodium chloride, potassium chloride and the like. Particularly, an aqueous solution of ammonium bromide is preferably used. The halogen contained in the halide aqueous solution (A) should be the same as that contained in the halide aqueous solution (B). The halide contained in the halide aqueous solution (A) and the halide contained in the halide aqueous solution (B) may be the same or may be different from each other. Preferably, the halide contained in the aqueous solution (A) and the halide contained in the aqueous solution (B) are the same.

The concentration of the halide aqueous solution (B) is preferably 0.5 mol/L or more. If the concentration is less than 0.5 mol/L, yield may be lowered, which is not preferable in terms of productivity.

A ratio between mole number of the fluoride in the fluoride aqueous solution and mole number of the halide in the halide aqueous solution (B) (that is, a mole number ratio between the fluoride and the halide) is preferably approximately 1. When the ratio is set to approximately 1, the amount of ions participating in the reaction can be made uniform. Both raw materials can be effectively utilized and no residue of the raw materials will remain.

Here, a state in which the above-described ratio is approximately 1 means a state in which the ratio in mole numbers between the fluoride and the halide is in a range from 0.7 to 1.3, preferably in a range from 0.9 to 1.1., and most preferably exactly 1 from a stoichiometric point of view.

Examples of the barium salt contained in the barium salt aqueous solution include materials which are easily dissolved in water, such as barium acetate, barium nitrate, barium hydroxide and barium benzoate. Particularly, barium acetate is preferably used.

The concentration of the barium salt aqueous solution is preferably 0.5 mol/L or more. If the concentration is less than 0.5 mol/L, yield may be lowered, which is not preferable in terms of productivity.

The fluoride aqueous solution, the halide aqueous solution (B) and the barium salt aqueous solution which are to be mixed (which may be generically referred to as "raw material aqueous solutions") are preferably mixed in such a manner that: (1) these aqueous solutions are independently mixed into the halide aqueous solution (A) at the same time; or (2) a mixed solution (also included in the concept of raw material aqueous solutions) of the fluoride aqueous solution and the halide aqueous solution (B) is prepared, and this mixed solution and the barium salt aqueous solution are independently mixed into the halide aqueous solution (A) at the same time. If the above-described raw material aqueous solutions are mixed into the halide aqueous solution (A) in a state of being previously mixed together or are mixed into the halide aqueous solution (A) sequentially, various side reactions proceed and the yield of the BaFX-based crystal which is a desired material may be lowered. Further, if the BaFX-based crystal is prepared without using the halide aqueous solution (A), various side reactions will proceed. This case is also not preferable. The raw material aqueous solutions are preferably mixed into the halide aqueous solution (A) while being stirred, by using a pipe fitted with a pump, or the like.

In the preparing method of the present invention, when, for example, an aqueous solution of ammonium bromide is used as the halide aqueous solution (A) and as the halide aqueous solution (B), an aqueous solution of ammonium fluoride is used as the fluoride aqueous solution, and an aqueous solution of barium acetate is used as the barium salt aqueous solution, it is considered that a reaction shown by the following reaction formula (2) proceeds in the precipitate generating process.

$$Ba(CH_3COO)_2 + NH_4F + NH_4Br \rightarrow BaFBr\downarrow + 2NH_4^+ + 2CH_3COO^- \quad (2)$$

The reaction shown by the above-described reaction formula (2) does not proceed in the same way as in the reaction described in Japanese Patent Application Laid-Open (JP-A) Nos. 7-233369 and 10-195431 (shown by the above reaction formula (1)). Therefore, variation of the amount of Br before and after the reaction and during the reaction is restrained and substantially no material is consumed wastefully. Accordingly, the BaFX-based crystal can be efficiently prepared.

In the present invention, in order that fluorescence characteristics are imparted to the BaFX-based crystal that is obtained, an activator is preferably mixed into the halide aqueous solution (A) at the same time as mixing of the raw material aqueous solutions, or before the mixing. The activator may be added to one or more of the raw material aqueous solutions.

Preferred examples of the activator include halides of Ce, Pr, Sm, Eu, Gd, Tb, Tm and Yb. Particularly, europium bromide and cerium bromide are preferable. The amount of the activator to be mixed in can be optimized in accordance with intended performance.

As other components for the crystal, a material freely selected from alkali metals such as Li, Na, K, Rb and Cs and alkali earth metals such as Mg, Ca and Sr, can be used.

The temperature (reaction temperature) of the halide aqueous solution (A) at the time when the above-described components are mixed together to thereby produce the precipitate is preferably in the range from 20 to 100° C. At the time of mixing, a small amount of acid, ammonia, alcohol, water-soluble high polymer, water-insoluble metal oxide fine-grain powder and the like may be added as necessary.

Due to the above-described process, the precipitate of BaFX-based crystal is generated.

[Separating Process]

The separating process is a process in which the precipitate of BaFX-based crystal obtained by the precipitate generating process is separated from the reactant mother liquor. This process is preferably provided subsequent to the precipitate generating process. Examples of methods for separating the precipitate include filtration, centrifugation and the like.

[Calcination Process]

The calcination process is a process in which the precipitate of BaFX-based crystal obtained by the separating process is calcined. This process is provided subsequent to the separating process. If the activator is added, stimulable characteristics can be imparted to the BaFX-based crystal.

In the calcination process, the precipitate of BaFX-based crystal obtained by the separating process is dried, and fine powder of a sintering inhibitor such as alumina fine powder or silica fine powder is added to and mixed with the dried precipitate, so as to adhere homogeneously to surfaces of the BaFX-based crystal. The addition of the fine powder of sinter inhibitor may not be required depending on calcination conditions.

The precipitate of BaFX-based crystal, to which the fine powder of sinter inhibitor has been, if necessary, added, is packed into a heat resistant container such as a quartz boat, a quartz crucible or an alumina crucible, and placed and calcined in a reactor core of an electric furnace. The calcination temperature is preferably in the range from 400 to 1300° C., and more preferably in the range from 500 to 1000° C. The calcination time may suitably be 0.5 to 12 hours, although this varies depending on the amount of the precipitate of BaFX-based crystal, calcination temperature, temperature at which the precipitate is taken out from the electric furnace, and the like. Examples of an atmosphere employed for the calcination include a neutral atmosphere such as a nitrogen gas atmosphere, an argon gas atmosphere, or the like; a weakly reducing atmosphere such as a nitrogen gas atmosphere containing a small amount of hydrogen gas, a carbon dioxide atmosphere containing carbon monoxide, or the like; an atmosphere into which a very small amount of oxygen is introduced; and the like.

The BaFX-based crystal prepared by the above-described processes may be in a state of a solid solution or a mixture.

The BaFX-based crystal prepared by the preparation method of the present invention can be used for phosphor materials and various other applications. Further, when stimulable characteristics are imparted to the BaFX-based crystal, the crystal can be used as a stimulable phosphor for a radiation image conversion panel.

EXAMPLES

Examples of the present invention will be described hereinafter, but the present invention is not limited to these examples.

Example 1

[Precipitate Generating Process]

1200 ml of an aqueous solution of $NH_4Br$ (containing 0.196 g of $EuBr_3$, 0.999 g of $CaBr_2$ and 0.018 g of KBr) having a concentration of 4.2 M ("M" means "mol/L") was placed in a reactor equipped with a stirrer, and was stirred and kept at 40° C. To the resulting aqueous solution, 500 ml of an aqueous solution of barium acetate having a concentration of 1M and 500 ml of a mixed aqueous solution of ammonium fluoride and ammonium bromide (containing 0.5 mol of $NH_4F$ and 0.5 mol of $NH_4Br$) were simultaneously added at a fixed flow rate of 60 ml/min each, to thereby generate a precipitate of BaFX-based crystal.

[Separating Process]

A reactant mother liquor containing the obtained precipitate (crystal grains) was filtered and the crystal grains were washed with 2 liters of methanol. The washed precipitate was dried in a vacuum at 120° C. for four hours to thereby obtain 85 g of powdered europium-activated fluorobromide barium.

[Calcination Process]

To 50 of the obtained powdered europium-activated fluorobromide barium, 1% by weight of an ultra-fine grain powder of alumina was added for the purpose of preventing fusion between grains during the calcination, and thoroughly mixed by a mixer. The obtained mixture was packed in a quartz boat and calcined by using a tube furnace for two hours at 850° C. in a nitrogen gas atmosphere, to obtain grains of a europium-activated barium fluorobromide stimulable phosphor ($Ba_{0.99}Ca_{0.01}FBr$: $0.0003K^+$, $0.001Eu^{2+}$).

Example 2

[Precipitate Generating Process]

1200 ml of an aqueous solution of $NH_4Br$ having a concentration of 4.6 M (the solution containing 0.196 g of $EuBr_3$, 0.999 g of $CaBr_2$ and 0.018 g of KBr) was placed in a reactor equipped with a stirrer, and was stirred and kept at 40° C. To the resulting aqueous solution, 500 ml of an aqueous solution of barium acetate having a concentration of 1M and 500 ml of a mixed aqueous solution of ammonium fluoride and ammonium bromide (containing 0.5 mol of $NH_4F$ and 0.5 mol of $NH_4Br$) were simultaneously added at a fixed flow rate of 60 ml/min each to thereby generate a precipitate of BaFX-based crystal.

[Separating Process]

96 g of powdered europium-activated barium fluorobromide was obtained from the generated crystal grains in the same way as in Example 1.

[Calcination Process]

50 g of the obtained powdered europium-activated barium fluorobromide was calcined in the same way as in Example 1, and grains of a europium-activated barium fluorobromide stimulable phosphor ($Ba_{0.99}Ca_{0.01}FBr$: $0.0003K^+$, $0.001Eu^{2+}$) were obtained.

Example 3

[Precipitate Generation Process]

1200 ml of an aqueous solution of $NH_4Br$ having a concentration of 5.0 M (the solution containing 0.196 g of $EuBr_3$, 0.999 g of $CaBr_2$ and 0.018 g of KBr) was placed in a reactor equipped with a stirrer, and stirred and kept at 40° C. To the resulting aqueous solution, 500 ml of an aqueous solution of barium acetate having a concentration of 1M and 500 ml of a mixed aqueous solution of ammonium fluoride and ammonium bromide (containing 0.5 mol of $NH_4F$ and 0.5 mol of $NH_4Br$) were simultaneously added at a fixed flow rate of 60 ml/min each to thereby generate a precipitate of BaFX-based crystal.

[Separating Process]

98 g of powdered europium-activated barium fluorobromide was obtained from the generated crystal grains in the same way as in Example 1.

[Calcination Process]

50 g of the obtained powdered europium-activated barium fluorobromide was calcined in the same way as in Example 1, and grains of a europium-activated barium fluorobromide stimulable phosphor ($Ba_{0.99}Ca_{0.01}FBr$: $0.0003K^+$, $0.001Eu^{2+}$) were obtained.

Comparative Example 1

[Precipitate Generation Process]

A mixed solution of 2000 ml of an aqueous solution of $NH_4Br$ (3.0 mol/L), 12.5 ml of an aqueous solution of $EuBr_3$ (0.2 mol/L), 1.18 g of $CaBr_2.2H_2O$ and 19.7 g of KBr was placed in 4000 ml of a reactor. The mixed solution contained in the reactor was held at 60° C. and stirred by rotating a stirrer having a screw-type mixing blade, whose diameter was 60 mm, at 500 rpm.

50 ml of an aqueous solution of ammonium fluoride (10 mol/L) and 200 ml of an aqueous solution of barium bromide (2.5 mol/L) were put into the mixed solution, whose temperature was being held while being stirred, at feeding rates of 1 ml/min and 4 ml/min by using a cylinder pump having a high precision of feeding to thereby generate a precipitate.

The above-described precipitate generating process is a retry process of a well-known method (see Example 10 described in JP-A No. 7-233369) and has a feature that the amount of $Br^-$ changes during the course of the reaction.

[Separating Process]

110 g of powdered europium-activated barium fluorobromide was obtained from the generated precipitate in the same way as in Example 1.

[Calcination Process]

50 g of the obtained powdered europium-activated barium fluorobromide was calcined in the same way as in Example 1 and grains of a europium-activated barium fluorobromide stimulable phosphor were obtained.

Amounts of $Br^-$ after the reaction (mixing) in each of the precipitate generating processes of Examples 1 to 3 and Comparative example 1 (the change in the number of moles of $Br^-$ between before and after the reaction) is shown in table 1 below.

In table 1, an initial concentration of $NH_4Br$ means a concentration at a time when $NH_4Br$ was initially put into a reactor, and the numbers of moles of $Br^-$ before and after the reaction mean amounts theoretically obtained from the initial concentration of $NH_4Br$ and of the mixed $EuBr_3$, $CaBr_2$, KBr and ammonium bromide.

The principal composition of each of the powdered europium-activated barium fluorobromides of Examples 1 to 3 and Comparative Example 1 obtained after the separating process was measured by a powder X-ray diffraction method. Measurement conditions are described below. The results of measurement are shown in table 1.

tube voltage: 40 kV
tube current: 30 mA
$2\theta$: 10 to 70°
sampling width: 0.020°
scanning speed: 3.00°/min
divergence slit: 1°
scattering slit: 1°
light-receiving slit: 0.15 mm
radiation source: CuK alpha rays

TABLE 1

| | Initial concentration of $NH_4Br$ (mol/L) | Number of moles of $Br^-$ | | | Principal composition |
|---|---|---|---|---|---|
| | | Before reaction | After reaction | Change in number | |
| Example 1 | 4.20 | 5.05 | 5.05 | ±0 | $BaFBr(+BaF_2)$ |
| Example 2 | 4.60 | 5.53 | 5.53 | ±0 | BaFBr |
| Example 3 | 5.00 | 6.01 | 6.01 | ±0 | BaFBr |
| Comparative Example 1 | 2.98 | 6.18 | 6.68 | +0.5 | BaFBr |

In each of Examples 1 to 3, the supplied Br was effectively utilized and no excess material remained.

According to the method for preparing a barium fluorohalide-based crystal of the present invention, halide ions in the preparation process are effectively utilized and no excess material thereof remains. Further, a BaFX-based crystal can be prepared under conditions such that variation in the amount of halide ions existing in a reactant mother liquor is small.

What is claimed is:

1. A method for preparing barium fluorohalide-based crystal, the method comprising the steps of:
preparing a halide aqueous solution (A);
preparing a halide aqueous solution (B) which includes a halogen the same as a halogen included in the halide aqueous solution (A);
preparing a fluoride aqueous solution;
preparing a barium salt aqueous solution; and thereafter
mixing the halide aqueous solution (B), the fluoride aqueous solution and the barium salt aqueous solution into the halide aqueous solution (A) for generating a precipitate of BaFX-based crystals, in which X represents any of Br, Cl and I;
wherein the mixing is conducted in such a manner that (1) the halide aqueous solution (B), the fluoride aqueous solution and the barium salt aqueous solution are independently mixed in the halide aqueous solution (A) at the same time, or (2) a mixed solution of the fluoride aqueous solution and the halide aqueous solution (B) is prepared, and the mixed solution and the barium salt aqueous solution are independently mixed into the halide aqueous solution (A) at the same time.

2. The method for preparing barium fluorohalide-based crystal according to claim 1, wherein the halogen included in the halide aqueous solution (A) and the halogen included in the halide aqueous solution (B) are both Br.

3. The method for preparing barium fluorohalide-based crystal according to claim 1, wherein the precipitate generating step comprises the sub-step of further mixing an activator into the halide aqueous solution (A).

4. The method for preparing barium fluorohalide-based crystal according to claim 1, further comprising the step of separating the precipitate from a reactant mother liquor.

5. The method for preparing barium fluorohalide-based crystal according to claim 4, further comprising the step of calcining the separated precipitate.

6. The method for preparing barium fluorohalide-based crystal according to claim 1, wherein the concentration of the halide aqueous solution (A) is in the range from 4.2 mol/L to a saturation concentration.

7. The method for preparing barium fluorohalide-based crystal according to claim 1, wherein the halide aqueous solution (A) comprises an aqueous solution of ammonium bromide.

8. The method for preparing barium fluorohalide-based crystal according to claim 1, wherein a ratio between mole number of the fluoride of the fluoride aqueous solution and mole number of the halide of the halide aqueous solution (B) is approximately 1.

9. The method for preparing barium fluorohalide-based crystal according to claim 8, wherein the ratio of fluoride mole number to halide mole number is from 0.7 to 1.3.

10. The method for preparing barium fluorohalide-based crystal according to claim 1, wherein the halide aqueous solution (B) comprises an aqueous solution of ammonium bromide.

11. The method for preparing barium fluorohalide-based crystal according to claim 1, wherein a halogen included in the halide aqueous solution (A) and a halogen included in the halide aqueous solution (B) are both a halogen selected from the group consisting of Br and I.

12. The method for preparing barium fluorohalide-based crystal according to claim 1, wherein the concentration of the halide aqueous solution (B) is at least 0.5 mol/L.

13. The method for preparing barium fluorohalide-based crystal according to claim 1, wherein each halide aqueous solution comprises aqueous solution of a halide selected from the group consisting of ammonium bromide, hydrogen bromide, lithium bromide, potassium bromide, hydrogen iodide, ammonium iodide, lithium iodide, sodium iodide, potassium iodide, hydrogen chloride, ammonium chloride, lithium chloride, sodium chloride and potassium chloride.

14. The method for preparing barium fluorohalide-based crystal according to claim 1, wherein the barium salt aqueous solution comprises a barium salt selected from the group consisting of barium acetate, barium nitrate, barium hydroxide and barium benzoate.

15. The method for preparing barium fluorohalide-based crystal according to claim 1, wherein the concentration of the barium salt aqueous solution is at least 0.5 mol/L.

16. The method for preparing barium fluorohalide-based crystal according to claim 3, wherein the activator comprises at least one halide selected from the group consisting of halides of Ce, Pr, Sm, Eu, Gd, Tb, Tm and Yb.

17. A method for preparing barium fluorohalide-based crystal, the method comprising steps of:
providing a halide aqueous solution (A);
providing a halide aqueous solution (B) which includes a halogen the same as a halogen included in the halide aqueous solution (A); and
substantially simultaneously mixing each of the halide aqueous solution (B), a fluoride aqueous solution and a barium salt aqueous solution into the halide aqueous solution (A).

18. The method for preparing barium fluorohalide-based crystal according to claim 17, wherein the halogen included in the halide aqueous solution (A) and the halogen included in the halide aqueous solution (B) are both Br.

19. A method for preparing barium fluorohalide-based crystal, the method comprising the steps of:
providing a halide aqueous solution (A);
preparing a mixed solution of a fluoride aqueous solution and a halide aqueous solution (B) which includes a halogen the same as a halogen included in the halide aqueous solution (A); and
substantially simultaneously mixing each of the mixed solution and a barium salt aqueous solution into the halide aqueous solution (A).

20. The method for preparing barium fluorohalide-based crystal according to claim 19, wherein the halogen included in the halide aqueous solution (A) and the halogen included in the halide aqueous solution (B) are both Br.

* * * * *